United States Patent
Ivacko et al.

(10) Patent No.: US 8,738,206 B2
(45) Date of Patent: May 27, 2014

(54) MAIN PUMP TO AUXILIARY PUMP HAND-OFF STRATEGY FOR MAINTAINING HYDRAULIC PRESSURE IN HYBRID TRANSMISSION

(75) Inventors: Joseph Ivacko, Fenton, MI (US); Laszlo M. Hideg, Sterling Heights, MI (US); Salim Hamam, Dearborn Heights, MI (US)

(73) Assignee: Chrysler Group LLC, Auburn Hills, MI (US)

( * ) Notice: Subject to any disclaimer, the term of this patent is extended or adjusted under 35 U.S.C. 154(b) by 177 days.

(21) Appl. No.: 13/344,895

(22) Filed: Jan. 6, 2012

(65) Prior Publication Data

US 2013/0179013 A1    Jul. 11, 2013

(51) Int. Cl.
*B60W 20/00* (2006.01)
*B60W 10/30* (2006.01)

(52) U.S. Cl.
USPC .......................................................... 701/22

(58) Field of Classification Search
CPC .................................................. F16H 61/0031
See application file for complete search history.

(56) References Cited

U.S. PATENT DOCUMENTS

| | | |
|---|---|---|
| 7,415,820 B2 | 8/2008 | Moorman |
| 2003/0045988 A1 | 3/2003 | Suzuki et al. |
| 2003/0171187 A1 | 9/2003 | Aoki et al. |
| 2007/0213174 A1* | 9/2007 | Tamai et al. ..................... 477/52 |
| 2009/0118954 A1* | 5/2009 | Wu et al. .......................... 701/60 |
| 2009/0192685 A1* | 7/2009 | Sime ................................ 701/60 |
| 2009/0241535 A1* | 10/2009 | Schultz et al. .................. 60/486 |
| 2009/0247353 A1* | 10/2009 | Tryon et al. ..................... 477/20 |
| 2010/0251707 A1 | 10/2010 | Sah et al. |
| 2013/0000294 A1* | 1/2013 | Zhang et al. .................... 60/327 |

FOREIGN PATENT DOCUMENTS

| | | |
|---|---|---|
| EP | 2055608 A2 | 5/2009 |
| WO | 2007086194 A1 | 8/2007 |

OTHER PUBLICATIONS

International Search Report dated Mar. 7, 2013 for International Application No. PCT/US2012/071781, International Filing Date Dec. 27, 2012.
Written Opinion dated Mar. 7, 2013 for International Application No. PCT/US2012/071781, International Filing Date Dec. 27, 2012.

* cited by examiner

*Primary Examiner* — Khoi Tran
*Assistant Examiner* — Ryan Rink
(74) *Attorney, Agent, or Firm* — Ralph E. Smith

(57) ABSTRACT

A method and system of providing hydraulic pressure during a transition from gas-powered engine operation to electric motor operation in a hybrid electric vehicle. During the transition, main pressure arising from operation of a gas-powered engine with a main pump is matched with auxiliary pressure arising from operation of a battery-powered electric motor with an auxiliary pump. After matching the main and auxiliary pressures, the auxiliary pressure is boosted to an operational pressure in response to a triggering event.

20 Claims, 5 Drawing Sheets

MAIN PUMP TO AUXILIARY PUMP HAND-OFF STRATEGY FOR MAINTAINING HYDRAULIC PRESSURE IN HYBRID TRANSMISSION

FIELD

The present disclosure relates to systems and methods for operating a hybrid electric vehicle transmission, and more particularly to systems and methods for preventing loss of hydraulic pressurization during an initialization of the vehicle's electric propulsion mode.

BACKGROUND

A hybrid electric vehicle alternates between gas-powered engine operation and electric motor operation. The transition from operating the vehicle in a gas-powered mode to operating the vehicle in an electric mode, and vice versa, occurs while the vehicle is being used. Therefore, an effective transition from operation in one mode to another is imperative so that no loss of vehicle function or control occurs during the vehicle operation. For example, when transitioning from gas-powered operation to electric mode operation, care must be taken to ensure that the vehicle's electric mode operation is fully functional before shutting down the vehicle's gas-powered engine.

Currently, however, the potential for ineffective transitioning between operating modes exists. Specifically, problems may occur in transitioning between the use of the gas-powered engine to pump transmission fluid and an auxiliary transmission fluid pump in the electric mode. In an advanced hybrid system truck ("AHS-T") hybrid transmission, an auxiliary pump provides pressurization of transmission fluid when the vehicle is in electric mode. The main pump driven by the gas-powered engine itself provides transmission fluid pressurization when the vehicle is in a gas-powered mode. During the transition from gas-powered engine propulsion to electric propulsion, the auxiliary pump is activated and the gas-powered engine (including the main pump) is allowed to shut down. Unfortunately, conventional hybrid transmissions are susceptible to prematurely shutting down the gas-powered engine before the auxiliary pump is fully operational. Specifically, during cold ambient temperatures or cold transmission fluid temperature conditions, the auxiliary pump is prone to stall during its initial activation stage. When this happens, the vehicle may lose power and control. The consequences of the power failure range from simple inconvenience to unacceptably dangerous. Therefore, systems and methods that ensure a proper transition from gas-powered engine operation to electric motor operation are clearly desirable.

SUMMARY

In one form, the present disclosure provides a method of providing hydraulic pressure during a transition from gas-powered engine operation to electric motor operation in a hybrid electric vehicle. During the transition, main pressure arising from operation of a gas-powered engine with a main pump is matched with auxiliary pressure arising from operation of a battery-powered electric motor with an auxiliary pump. After matching the main and auxiliary pressures, the auxiliary pressure is boosted to an operational pressure in response to a triggering event. The triggering event may include a first triggering event when a filtered speed of the auxiliary pump is within a predetermined range of a desired speed. Another triggering event may include a second triggering event when a speed of the gas-powered engine falls below a predetermined low-speed threshold. The second triggering event may be a backup triggering event to the first triggering event.

In another form, the present disclosure provides an auxiliary pump system in a hybrid electric vehicle. The system includes an auxiliary pump with an associated electric motor and is configured to maintain hydraulic pressurization in the hybrid electric vehicle's transmission system during a transition from operation of the hybrid electric vehicle's gas-powered engine to the hybrid electric vehicle's electric motor. The system also includes a processor configured to control the auxiliary pump and the gas-powered engine during a transition between vehicle operation in a gas-powered engine mode and vehicle operation in an electric motor mode. The processor control includes instructions for matching a main pressure arising from operation of a main pump associated with the gas-powered engine and an auxiliary pressure arising from operation of the auxiliary pump during the transition. The processor control also includes instructions for boosting the auxiliary pressure to an operational pressure in response to a triggering event. The triggering event may include a first triggering event when a filtered speed of the auxiliary pump is within a predetermined range of a desired speed. Another triggering event may include a second triggering event when a speed of the gas-powered engine falls below a predetermined low-speed threshold. The second triggering event may be a backup triggering event to the first triggering event.

Further areas of applicability of the present disclosure will become apparent from the detailed description provided hereinafter. It should be understood that the detailed description, including disclosed embodiments and drawings, are merely exemplary in nature intended for purposes of illustration only and are not intended to limit the scope of the invention, its application or use. Thus, variations that do not depart from the gist of the invention are intended to be within the scope of the invention.

DETAILED DESCRIPTION

Figure 1:
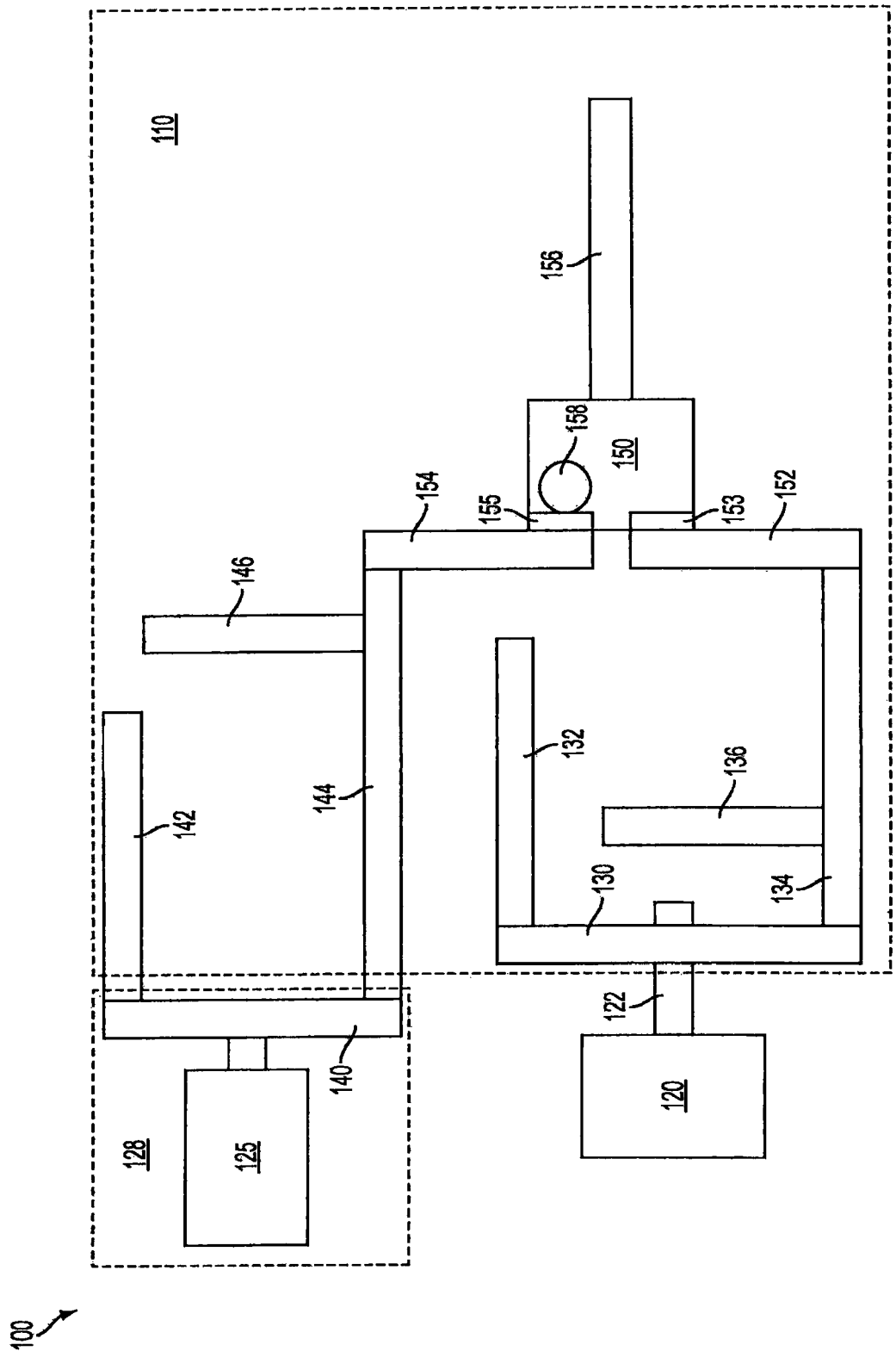
FIG. 1 is a block diagram of the mechanical and hydraulic layout of a hybrid electric vehicle according to the principles of the present disclosure.

The mechanical and hydraulic layout 100 of a hybrid transmission are illustrated in FIG. 1. As indicated in the layout 100, a gas-powered engine 120 turns a crankshaft 122. Attached to the crankshaft 122 and inside a transmission case 110 is a main pump impeller 130. Oil from a sump enters the main pump impeller 130 at an input 132 and exits as pressurized oil at output 134. An exhaust port 136 is coupled to the pressurized output 134. The pressurized oil exits the transmission case 110 after passing through a check valve 150, as explained below.

An alternative oil flow path dependent on an electric motor is also illustrated in the layout 100 of FIG. 1. An auxiliary pump 128 includes an electric motor 125 and an impeller 140. The electric motor 125 is powered by a battery and functions to pump oil from a sump into an auxiliary pump impeller 140 via an input 142. The oil is pressurized by the auxiliary pump impeller 140 and is output via output 144 to the check valve 150. An exhaust port 146 is coupled to the pressurized output 144.

The check valve 150 includes two input ports 152, 154 and an output port 156. Both input ports 152, 154 include a check ball seat 153, 155, respectively. The check ball seat 153, 155 is for positioning a check ball 158 that "checks" or stops the flow of oil from an input port 152, 154 unless the inflow exceeds a minimum pressure threshold. Therefore, when gas-powered engine 120 is operating and pressurizing the hydraulic system, and while the electric motor 125 is off, the check ball 158 is displaced from the check ball seat 153 (as shown in FIG. 1) of input port 152 because the oil pumped by the engine 120 is sufficiently pressurized. Alternatively, when the electric motor 125 is operating and pressurizing the hydraulic system via the auxiliary pump 128, and while the gas-powered engine 120 is off, the check ball 158 is displaced from the check ball seat 155 of input port 154 because the oil pumped by the auxiliary pump 128 is sufficiently pressurized.

Maintaining sufficient hydraulic pressure during the transition from electric motor operation to gas-powered engine operation or from gas-powered engine operation to electric motor operation is critical in order to consistently provide power and control to a connected load (for example, a vehicle's drive wheels). As described below, the handoff from electric motor control to gas-powered engine control is generally smooth and without concern. However, the handoff from gas-powered engine control to electric motor control requires additional actions to ensure a smooth and consistent transition.

Consider first the handoff from electric motor control to gas-powered engine control. During electric motor operation, the auxiliary pump electric motor 125 spins the auxiliary pump impeller 140 to draw oil from the sump supply via input 142. The impeller 140 functions to pressurize the oil which is output via output 144 and transferred to the check valve 150 via input port 154. During electric motor operation, the check ball 158 is located in the check ball seat 153, thus forcing oil to the transmission via output port 156. In the transition to gas-powered engine propulsion, the gas-powered engine 120 begins to spin the crankshaft 122 and the main pump impeller 130, drawing oil from the sump supply via input 132. Thus, pressurized oil is output via output 134 and is transferred to the input port 152. As long as the pressurized oil is of sufficient pressure, the check ball 158 will move from check ball seat 153 to check ball seat 155. Since the flow and pressure from the main pump impeller 130 is much greater than that supplied by the auxiliary pump impeller 140, the transition is quick and definite. Thus, the supply of oil output via output port 156 is uninterrupted. The timing of gas-powered engine 120 start and auxiliary pump electric motor 125 stop is nearly simultaneous. Any residual pressure from the electric motor 125 is vented back to the sump or other portions of the hydraulics via the exhaust port 146 because input port 154 is blocked by the check ball 158 seated in check ball seat 155.

The pressure difference that arises between the main pump impeller system and the auxiliary pump impeller system which makes the transition from electric propulsion to gas-powered engine propulsion so straightforward also makes the transition from gas-powered engine propulsion to electric propulsion a challenge. The transition from gas-powered engine propulsion to electric propulsion requires additional steps in order to consistently provide hydraulic pressure delivery to the transmission output port 156. The additional steps include both ensuring near-constant oil pressure at output port 156 and preventing the auxiliary pump electric motor 125 from stalling while the auxiliary pump electric motor 125 is still spinning-up to a desired speed. Not only does the stalling of auxiliary pump electric motor 125 result in inconsistent hydraulic pressure delivery at output port 156, but such stalling can also result in clutch slip and unnecessary wear. These potential problems are highlighted in the description below regarding the transition from gas-powered engine propulsion to electric propulsion.

During gas-powered engine propulsion, the rotating gas-powered engine 120 spins the crankshaft 122 and the main pump impeller 130. The rotation draws oil from the sump supply via input 132 and pressurizes the output 134, input port 152, check valve 150 and output port 156. The sufficiently pressurized oil flow places the check ball 158 in the auxiliary circuit check ball seat 155 to seal away the inactive auxiliary pump system.

As the hybrid propulsion system transitions from engine propulsion to electric propulsion, the auxiliary pump electric motor 125 begins to spin and draw oil from the sump supply via input 142. Pressurization of output 144 and input port 154 begins. However, because the main pump impeller 130 can deliver much more flow and pressure than the auxiliary pump impeller 140, the check ball 158 tends to remain in the check ball seat 155. If the check ball 158 remains in check ball seat 155 for too long, however, the auxiliary pump electric motor 125 will stall, potentially resulting in significant hydraulic pressure drop at output 156 if the main pump impeller 130 is already spinning down.

Figure 2:
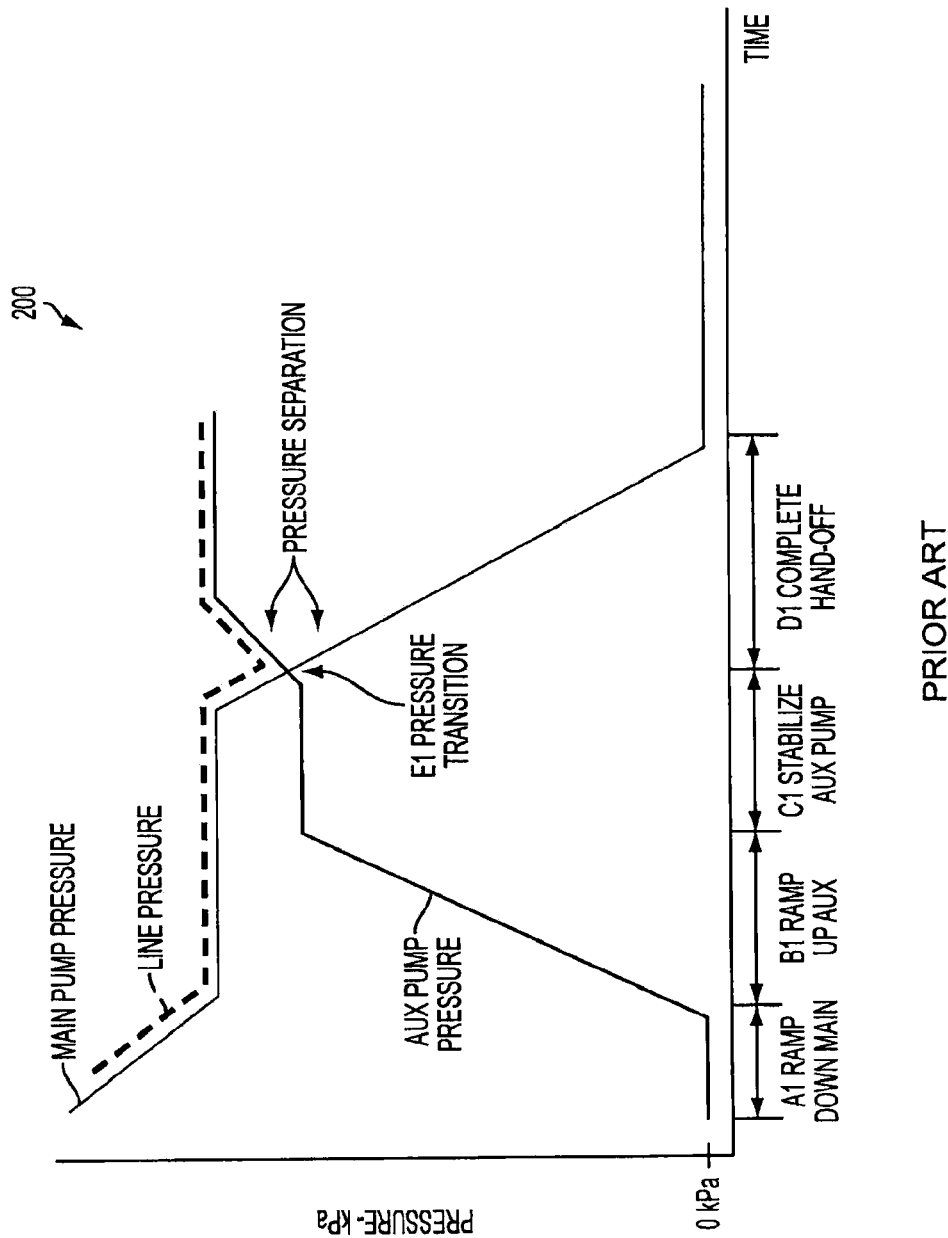
FIG. 2 is a timeline of a traditional main pump to auxiliary pump hand-off strategy in a hybrid electric vehicle.

The traditional method for ensuring proper check ball 158 seating during the transition from engine propulsion to electric propulsion is illustrated in FIG. 2. As illustrated in FIG. 2 and as explained below, the traditional strategy includes providing sufficient temporal separation between a ramping-up of the auxiliary pump impeller 140 and the full ramping-down of the main pump impeller 130.

FIG. 2 illustrates a timeline 200 that indicates relative pressures arising from operation of the main pump impeller 130 and the auxiliary pump impeller 140 as a function of time. During an initial time period A1, the gas-powered engine begins to ramp-down resulting in a corresponding decrease in line pressure arising from the main pump impeller 130. After an initial reduction in line pressure due to the initial spin down of the gas-powered engine, the auxiliary pump is activated and pressure due to the auxiliary pump impeller begins to ramp-up during time period B1. During time period B1, the pressure arising from the main pump impeller remains relatively constant. Once the auxiliary pump impeller has completed an initial ramp-up, the pressure arising from the operation of the auxiliary pump impeller is held constant during a time period C1 to ensure that operation of the auxiliary pump is stable. During time period C1, the gas-powered engine and main pump impeller continue to operate as well, generating a higher pressure than that generated by the auxiliary pump impeller. Time period C1 must be long enough to ensure proper operation of the auxiliary pump but not so long as to result in the stalling of the auxiliary pump. After time period C1, and assuming that the auxiliary pump is still operating by the end of time period C1, the gas-powered engine is allowed to fully ramp-down while the auxiliary pump is fully-ramped up (during time period D1). At some time E1 during time period D1, the pressures generated by the main pump impeller and the auxiliary pump impeller are equal. Therefore, at time E1, the check-ball 158 moves from check ball seat 155 to check ball seat 153.

Unfortunately, there is a tendency during the transition for the auxiliary pressure in output 144 and input port 154 to bleed back into the main pump impeller system (e.g., in output 134 and input port 152) if the check ball 158 fails to seat properly during or after the transition at time E1. If a bleed event occurs, auxiliary pressure in output 144 and input port 154 may be inadequate to maintain torque delivery. Additionally, if such an event occurs, because the gas-powered engine is already ramping-down, the main pump impeller is not able to restore adequate torque delivery without the gas-powered engine ramping-up again.

The traditional strategy for transitioning from gas-powered engine operation to auxiliary pump operation is improved by matching pressures between the components of the main pump impeller system (e.g., output 134 and input port 152) and the components of the auxiliary pump system (e.g., output 144 and input port 154) during the auxiliary pump electric motor 125 spin up phase. This pressure matching results in a lower propensity for the auxiliary pump electric motor 125 to stall. Matching pressures, however, does not reliably seat the check ball 158 in the check ball seat 153 position. Therefore, pressure in the auxiliary pump system components (e.g., output 144 and input port 154) must be raised above the main pump impeller system pressure (at, e.g., output 134 and input port 152) prior to gas-powered engine 120 shutdown to insure that the check ball 158 seats to check ball seat 153. These improvements result in an avoidance of auxiliary pump stall and maintenance of reliable hydraulic pressure delivery to the transmission via output port 156.

Figure 3:
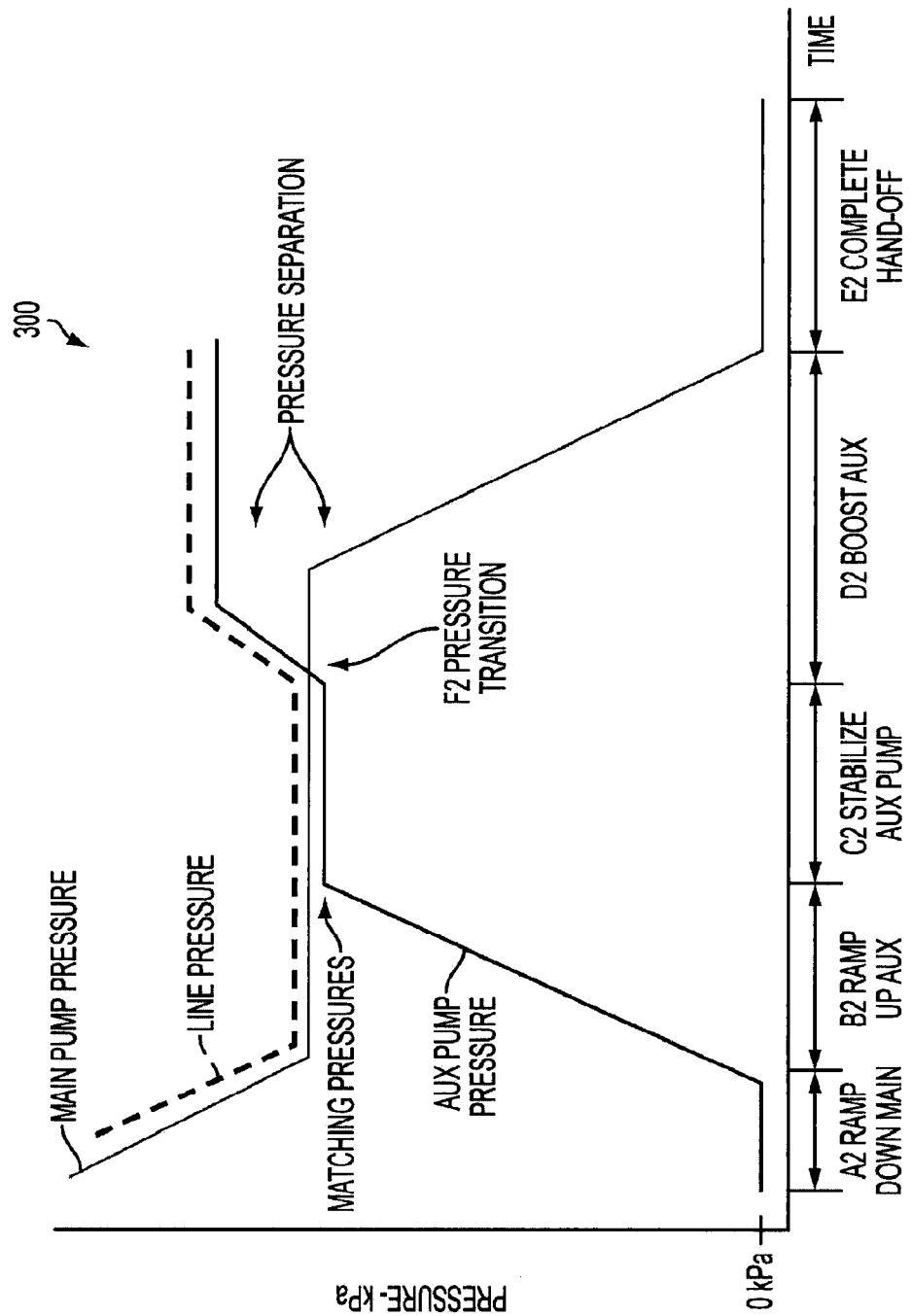
FIG. 3 is a method of a main pump to auxiliary pump hand-off strategy in a hybrid electric vehicle according to the principles of the present disclosure.

FIG. 3 illustrates the improved timing strategy 300 for transitioning from gas-powered engine operation to auxiliary pump operation. At the beginning of time period A2, when the hybrid system determines that conditions are acceptable to transition from gas-powered engine propulsion to electric propulsion, the pressure provided by the main pump 130 is reduced. Pressure reduction continues throughout time period A2. At the end of time period A2 and during time period B2, the auxiliary pump 128 is activated and begins to spin. Pressure output resulting from the operation of auxiliary pump 128 increases during time period B2. Also, during time period B2, pressure output resulting from the operation of the gas-powered engine remains constant.

At the end of time period B2, the pressure arising from the auxiliary pump impeller operation is essentially equal to the pressure arising from main pump impeller operation. During the extent of time period C2, the pressures at check ball seat 153 and at check ball seat 155 are matched. Pressure matching during time period C2 reduces the propensity for the auxiliary pump electric motor 125 to stall during spin up. Once conditions are acceptable (as explained below in relation to FIG. 4), auxiliary pressure at check ball seat 155 is increased during time period D2.

In the completion of the handoff, the engine is spun down during time period E2, decreasing main pump pressure at check ball seat 153. There is only a moment where pressure is equal between the pressure arising from the main pump impeller 130 and the pressure arising from the auxiliary pump impeller 140, at transition time F2. At transition time F2, the pressure arising from the auxiliary pump impeller 140 may drop slightly with no adverse effects. Torque capacity is maintained throughout the system even if the check ball 158 fails to immediately transition from check ball seat 155 to check ball seat 153 due to the elevated auxiliary pressure at check ball seat 155.

Figure 4:
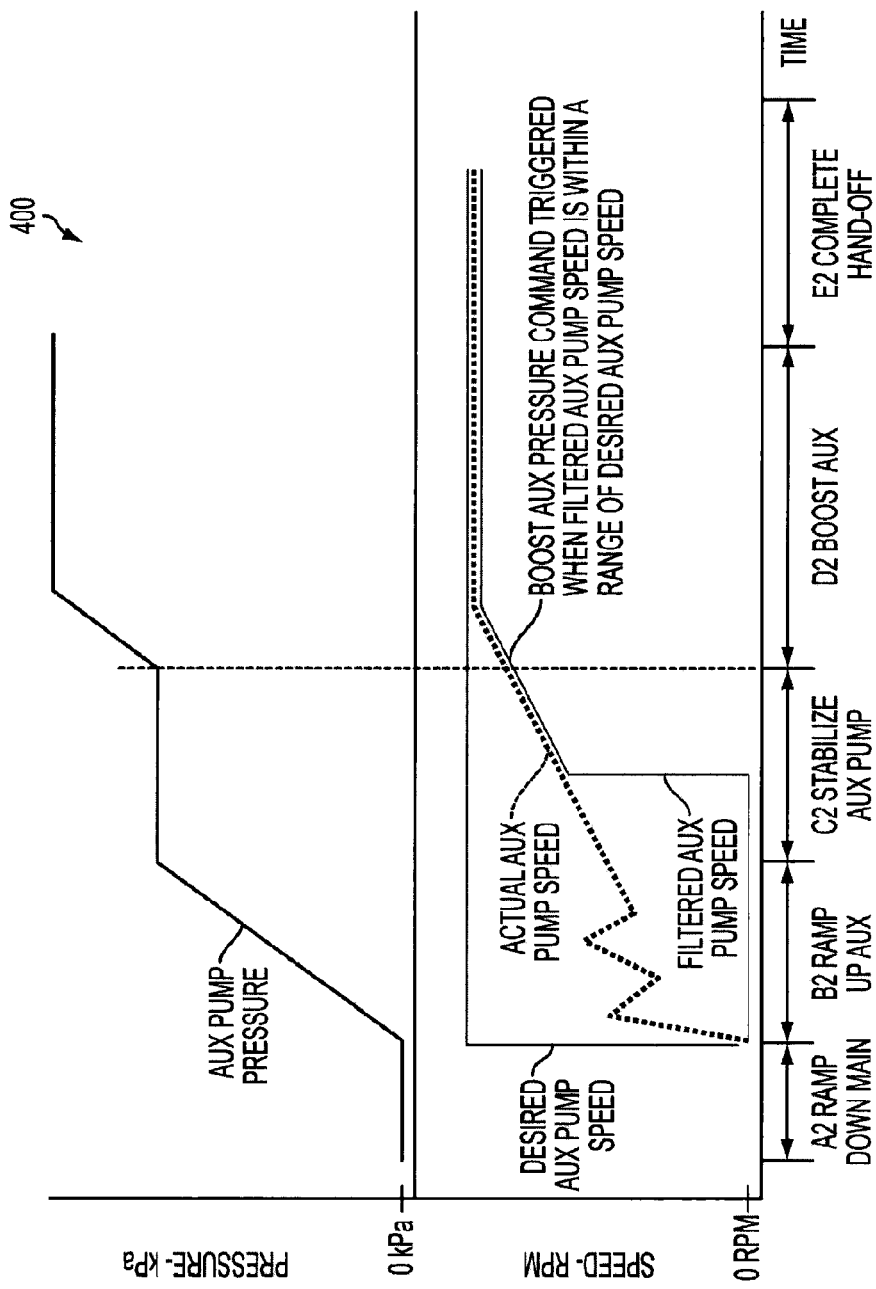
FIG. 4 is a timeline of a main pump to auxiliary pump hand-off strategy in a hybrid electric vehicle according to the principles of the present disclosure.

FIG. 4 illustrates the timing 400 for a primary trigger mechanism used to boost auxiliary pump pressure at check ball seat 155 during time period D2 (in FIGS. 3 and 4). When time period B2 begins, the auxiliary pump electric motor 125 is activated. A control system sends a desired auxiliary pump speed to the auxiliary pump electric motor 125. However, as discussed above, the auxiliary pump impeller 140 may stall during time period B2 as the auxiliary pump electric motor 125 attempts to overcome residual pressure in the auxiliary pressure circuit 144, 154, 155 and unseat check ball 158 from check ball seat 155. This tendency for early stalling is illustrated in FIG. 4 by the uneven actual auxiliary pump speed indicated during time period B2.

In order to avoid the potentially sporadic auxiliary pump speed, a filtered auxiliary pump speed is generated by the control system to eliminate pump speed spikes reported to the control system. The filtered auxiliary pump speed reports auxiliary pump speed only after the auxiliary pump electric motor 125 has entered a stable operating condition (usually during time period C2).

An increase in auxiliary pump pressure at check ball seat 155 is triggered once the filtered auxiliary pump speed is within a predetermined range of a desired auxiliary pump speed. This ensures that the auxiliary pump electric motor 125 obtains a stable operating environment prior to increasing the auxiliary pump pressure at check ball seat 155. The auxiliary pump pressure boost results in movement of the check ball 158 from check ball seat 155 to check ball seat 153.

As a backup, should the auxiliary pump electric motor 125 fail to obtain the desired operating condition (e.g., a sufficient speed) prior to the engine 120 shutdown, then an auxiliary pressure boost command is triggered based on engine revolutions per minute ("rpm") falling below a predetermined minimum threshold. This secondary trigger mechanism guarantees that the auxiliary boost pressure command is executed should the primary trigger fail to be met prior to gas-powered engine 120 shutdown.

Comparing FIG. 2 and FIGS. 3 and 4, the improved method disclosed herein results in elevated pressure delivery in the hydraulic system during the completion phase of the handoff process thereby reducing the risk of torque disruption should the check ball 158 fail to properly seat in check ball seat 153.

Figure 5:
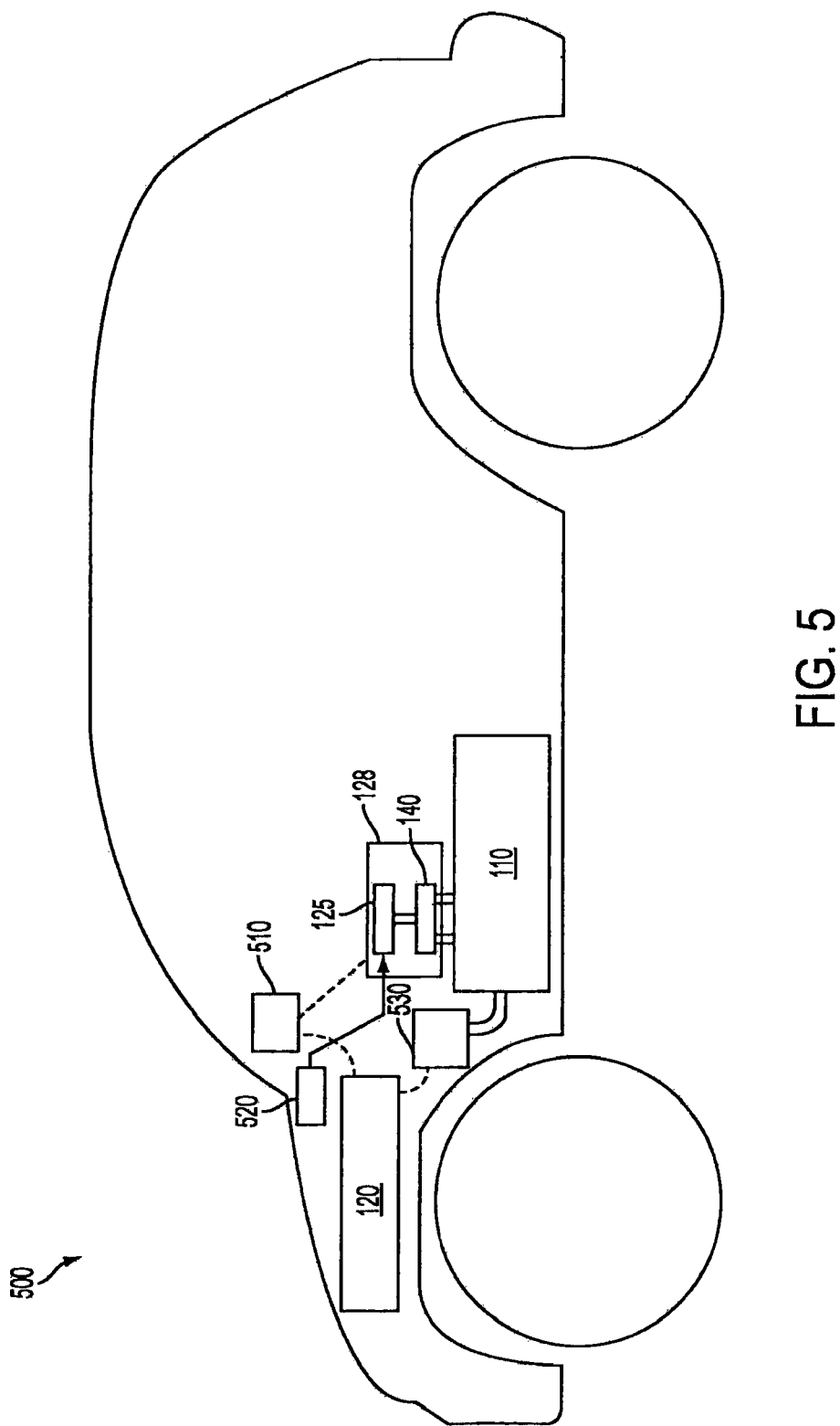
FIG. 5 is a block diagram of a hybrid electric vehicle according to the principles of the present disclosure.

FIG. 5 illustrates a hybrid electric vehicle 500 that includes the transmission case 110, the coupled gas-powered engine 120 and the auxiliary pump 128 with its associated electric motor 125 and auxiliary pump impeller 140. A processor 510 controls the operation of the gas-powered engine 120 and the auxiliary pump 128. The processor 510 is configured to determine the speed of the auxiliary pump 128 and the gas-powered engine 120 and to output control signals to the gas-powered engine 120 and the auxiliary pump 128, in accordance with the timeline and methods 300, 400 of FIGS. 3 and 4. Also shown is a 12V battery 520, for example, powering the auxiliary pump 128. A main pump 530 powered by the gas-powered engine 120 is also coupled to the transmission 110.

What is claimed is:
1. A method of providing hydraulic pressure during a transition from gas-powered engine operation to electric motor operation in a hybrid electric vehicle, the method comprising:
operating a gas-powered engine with a main pump and a battery-powered electric motor with an auxiliary pump by substantially matching, for a period of time until a triggering event occurs, a main pressure arising from operation of the main pump and an auxiliary pressure arising from operation of the auxiliary pump before the transition from gas-powered engine operation to electric motor operation has completed; and boosting the auxiliary pressure to an operational pressure in response to the triggering event.

2. The method of claim 1, further comprising monitoring a speed of the auxiliary pump while the main pressure and auxiliary pressure are matched.

3. The method of claim 2, wherein monitoring a speed of the auxiliary pump further comprises monitoring a filtered speed of the auxiliary pump.

4. The method of claim 3, wherein the triggering event is when the filtered speed of the auxiliary pump is within a predetermined range of a desired speed.

5. The method of claim 4, further comprising keeping the main pressure constant while the auxiliary pressure is boosted to the operational pressure.

6. The method of claim 5, further comprising decreasing the main pressure once the auxiliary pressure is at the operational pressure.

7. The method of claim 1, wherein the triggering event is when a speed of the gas-powered engine falls below a predetermined low-speed threshold.

8. The method of claim 1, wherein the triggering event comprises whichever of a first and second triggering event occurs first.

9. The method of claim 8, wherein the first triggering event is when a filtered speed of the auxiliary pump is within a predetermined range of a desired speed.

10. The method of claim 8, wherein the second triggering event is when a speed of the gas-powered engine falls below a predetermined low-speed threshold.

11. An auxiliary pump system in a hybrid electric vehicle, the system comprising:

an auxiliary pump with an associated electric motor, the auxiliary pump being configured to maintain hydraulic pressurization in the hybrid electric vehicle's transmission system during a transition from operation of the hybrid electric vehicle's gas-powered engine with associated main pump to the hybrid electric vehicle's electric motor with associated auxiliary pump; and a processor configured to control the operation of the auxiliary pump and the gas-powered engine during a transition between vehicle operation in a gas-powered engine mode and vehicle operation in an electric motor mode, said processor control comprising:

substantially matching, for a period of time until a triggering event occurs, a main pressure arising from operation of the main pump and an auxiliary pressure arising from operation of the auxiliary pump before the transition from gas-powered engine operation to electric motor operation has completed; and boosting the auxiliary pressure to an operational pressure in response to the triggering event.

12. The auxiliary pump system of claim 11, wherein the processor is further configured to monitor a speed of the auxiliary pump while the main pressure and auxiliary pressure are matched.

13. The auxiliary pump system of claim 12, wherein the processor is further configured to monitor a filtered speed of the auxiliary pump.

14. The auxiliary pump system of claim 13, wherein the triggering event is when the filtered speed of the auxiliary pump is within a predetermined range of a desired speed.

15. The auxiliary pump system of claim 14, wherein the processor is further configured to keep the main pressure constant while the auxiliary pressure is boosted to the operational pressure.

16. The auxiliary pump system of claim 15, wherein the processor is further configured to decrease the main pressure once the auxiliary pressure is at the operational pressure.

17. The auxiliary pump system of claim 11, wherein the triggering event is when a speed of the gas-powered engine falls below a predetermined low-speed threshold.

18. The auxiliary pump system of claim 11, wherein the triggering event comprises whichever of a first and second triggering event occurs first.

19. The auxiliary pump system of claim 18, wherein the first triggering event is when a filtered speed of the auxiliary pump is within a predetermined range of a desired speed.

20. The auxiliary pump system of claim 18, wherein the second triggering event is when a speed of the gas-powered engine falls below a predetermined low-speed threshold.

* * * * *